United States Patent [19]

Pohl et al.

[11] 4,261,833
[45] Apr. 14, 1981

[54] METHOD OF PRETREATING RAW WATER FOR REVERSE OSMOSIS UNITS

[75] Inventors: Kurt M. Pohl, Gummersbach; Gerhard Winkler, Marienheide, both of Fed. Rep. of Germany

[73] Assignee: L. & C. Steinmüller GmbH, Gummersbach, Fed. Rep. of Germany

[21] Appl. No.: 151,465

[22] Filed: May 19, 1980

[30] Foreign Application Priority Data

May 18, 1979 [DE] Fed. Rep. of Germany ....... 2920054

[51] Int. Cl.³ ............................ C02F 1/44; C02F 1/52
[52] U.S. Cl. ................................... 210/639; 210/652; 210/711; 210/787; 210/806
[58] Field of Search ..................... 210/23 F, 23 H, 45, 210/46, 47, 51, 52, 53, 54, 73 R, 259, 321 R, 433 M, 78

[56] References Cited

U.S. PATENT DOCUMENTS

| B 524,806 | 3/1976 | Ladha ................................. 210/23 F |
| 4,014,787 | 3/1977 | Shorr ................................. 210/23 F |
| 4,036,749 | 7/1977 | Anderson ............................... 210/45 |
| 4,170,328 | 10/1979 | Kirk ..................................... 210/45 |
| 4,188,291 | 2/1980 | Anderson ............................. 210/23 H |

Primary Examiner—Ernest G. Therkorn
Attorney, Agent, or Firm—Becker & Becker

[57] ABSTRACT

A method of pretreating raw water, for instance sea water, which is intended for supplying reverse osmosis units. An aqueous solution of acid salt and acid with the same anions is mixed with the raw water, whereby the most advantageous pH value is adjusted for the reverse osmosis, and whereby the acid salt is converted into the corresponding hydroxide. After possible addition of flocking or flaking additives, the resulting hydroxide flakes are separated, in a strongly concentrated form, by way of a centrifuge, particularly a plate or disc centrifuge, and together with fresh metal salt, are again brought into solution as a salt by means of the previously mentioned acid and, after mechanical purification in a second centrifuge, likewise particularly a plate or disc centrifuge, are again supplied to the raw water. The pretreated raw water leaves under pressure from the separator through which it flows and, alternatively, a chemical reducing agent may be added to this departing water flow. With a small requirement for metal salts, the recirculation can be eliminated. Also, the addition of the reducing agent to the pretreated raw water can be eliminated.

3 Claims, 1 Drawing Figure

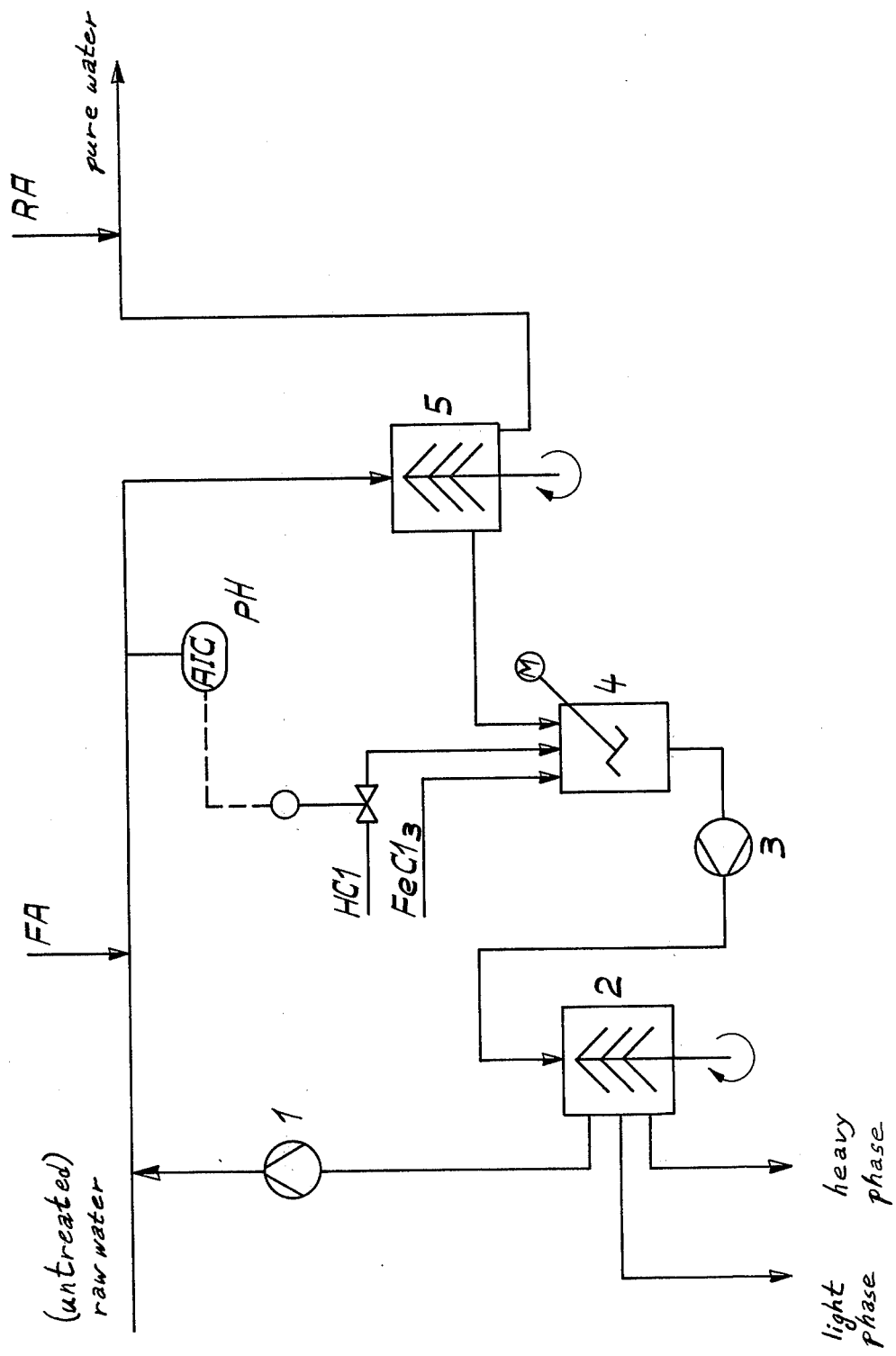

METHOD OF PRETREATING RAW WATER FOR REVERSE OSMOSIS UNITS

The present invention relates to prepurification of raw water, for example sea water, which is intended for supplying reverse osmosos units. It is known to pretreat salt-containing raw water by means of acid metal salts to separate the water in reverse osmosis units into permeate low in salt content and a concentrate rich in salt content. This raw water can be sea water, brackish water and/or other ground or surface water, or even waste water. Carrying out the pretreatment is effected by adding for instance iron III-chloride or aluminum sulfate in a pH value range in which the salts convert into the corresponding hydroxide or the corresponding oxide hydrate (in the following also designated as hydroxide). The flaky hydroxides thus resulting in the solution adsorptively take up undissolved, finely distributed organic and inorganic contaminations, which block or clog up the membranes of the reverse osmisis apparatus to be supplied, and which would disadvantageously influence the manner of operation thereof. A suitable flocking agent is periodically added to the solution for separating the flakes from the pretreated raw water; the flocking or flaking agent cross-links or aggregates the flakes (which form anyway without this agent) to increase the size thereof, and these enlarged flakes, with their adsorbed load, are then separated in sedimentation apparatus in a strongly diluted form.

This strong dilution is a great disadvantage of the known methods. Accordingly, a re-preparation is possible only with difficulty because of the great dilution. Drainage pits, or tapping beds, are necessary for a depositing, and the operation of these pits or beds is not without its problems because of the characteristic of the flakes. With the treatment of sea water or other surface water, a return or recycling of the hydroxide-containing water quantities into the sea or river is not possible for reasons of environmental protection since the hydroxide flakes can do great harm to the gill-breathing water life. Further disadvantages of this known method are the limiting granular size in the sedimentation apparatus, which hardly goes below 20 $\mu$m, and which, aside from the large space requirements of the sedimentation apparatus, additionally necessitates the use of a subsequent deposit or silt filtration, as well as the saturation content of dissolved hydroxides, for instance iron III-hydroxide, which at 0.05 ppb is very low and thus brings about that the iron compounds present in the treated raw water are extensively separated upon the membrane wall of the reverse osmosis unit and there lead to blocking or clogging.

An object of the present invention accordingly is to provide a method which does not, or as far as possible does not, have these disadvantages.

Further objects and advantages of the present invention will appear more clearly from the following specification in connection with the accompanying drawing, which schematically illustrates the features of the method in accordance with the teaching of the present invention.

The method of the present invention is characterized primarily by mixing an aqueous solution of acid salt and acid with the same anions with the raw water, as a result of which the most advantageous pH value for the reverse osmosis is adjusted, and whereby the acid salt is converted into the corresponding hydroxide; after possible addition of flocking or flaking additives, the resulting hydroxide flakes are, strongly concentrated, separated out by means of a centrifuge, especially a plate of disc centrifuge, and are brought back into solution again as a salt together with fresh metallic salt by means of the previously mentioned acid and, after mechanical purification in a second centrifuge, likewise especially a plate or disc centrifuge, are again supplied to the raw water; the pretreated raw water leaves under pressure from the separator through which it flows and, alternatively, a chemical reducing agent may be added to this departing water flow. Furthermore, with a small requirement for metallic salts, the recirculation may be eliminated. Finally, the addition of reducing agent to the pretreated raw water may be eliminated.

Referring now to the drawing in detail, the raw water to be treated, when using water from the environment, generally has a pH value which is above the optimum working or operating point (pH$\approx$6.5) of reverse osmosis membranes of cellulose triacetate (for the pH value adjustment, acid is necessary). This raw or untreated water, by means of the pump 1, is mixed with a solution which, aside from water, contains acid salt (for instance iron II-chloride) and an excess of mineral acid having the same anions as contained by the salt (for instance hydrochloric acid). A flocking or flaking additive FA (for instance a polyelectrolyte) is subsequently added to the water, and the resulting suspension of raw water and hydroxide flakes is supplied to a separator (plate or disc centrifuge) 5, from which pretreated raw water only having solid particles smaller than 20 $\mu$m flows directly under pressure to the reverse osmosis apparatus or to the conveying pump or pumps thereof. Consequently, a portion of the energy expended for the separators is recovered. The hydroxide slurry leaves the separator with a slurry concentration of about 5% solid content. The hydroxide slurry is mixed in a mixing apparatus 4, for instance with hydrochloric acid in a quantity which corresponds to the requirement of the raw water for pH value adjustment. An acid salt (for instance iron chloride) is additionally added into the mixing apparatus, this acid salt corresponds in quantity to covering the waste or loss and to the necessary circulating-out of consumed material. The solution resulting in the mixer 4 is supplied by means of the pump 3 to a further separator 2, from which three phases are removed as follows:

A heavy phase with undissolved contaminations; a light phase with undissolved and or swollen contaminations, both of which, for instance after neutralization, can be dumped, and which from a quantity standpoint however are small; and a middle or intermediate phase which, aside from water, contains dissolved acid salt and acid in excess, an excess which is required for the previously mentioned pH value adjustment in the raw water.

In order, when iron salts are used, to increase the solubility limit for the iron compound after separation of iron hydroxide in the separator, and accordingly to entirely or partially preclude a separation of iron hydroxide on the membrane wall of the reverse osmosis unit, it is alternatively inventively suggested to mix with the prepurified raw water a reducing additive RA, which transforms the iron III into the iron II-form.

The present invention is, of course, in no way restricted to the specific disclosure of the specification and drawing, but also encompasses any modifications within the scope of the appended claims.

What we claim is:

1. A method of pretreating raw water intended for supplying reverse osmosis units, said method including the steps of:

mixing with said raw water an aqueous solution, of acid salt and acid having the same anions, for the purpose of adjusting the pH value of said raw water to the value most advantageous to said reverse osmosis, and for converting said acid salt into flakes of the corresponding hydroxide;

centrifuging said solution to strongly concentrate said hydroxide flakes and to separate them from said solution;

redissolving said hydroxide flakes, along with fresh metallic salt, by means of said acid, as salt;

mechanically purifying said last mentioned solution solution in a second centrifuge;

repeating with this solution said steps of mixing said solution with said raw water and subsequently centrifuging said flakes and withdrawing said pretreated raw water; and withdrawing said pretreated raw water from said centrifuge-separator under pressure.

2. A method according to claim 1, which includes, prior to said centrifuging step, the further step of adding a flocking additive to said solution for at least partially aggregating said hydroxide flakes.

3. A method according to claim 1, which includes the step of adding a chemical reducing agent to said withdrawn pretreated raw water.

* * * * *